United States Patent
Schmitz et al.

(10) Patent No.: US 7,536,924 B2
(45) Date of Patent: May 26, 2009

(54) FLEXURE-BASED DYNAMOMETER FOR DETERMINING CUTTING FORCE

(75) Inventors: Tony Lavaun Schmitz, Gainesville, FL (US); Gregory Scott Duncan, Gainesville, FL (US); John Charles Ziegert, Gainesville, FL (US); David Corbin Burton, Carolina Beach, NC (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 11/576,200

(22) PCT Filed: Sep. 29, 2005

(86) PCT No.: PCT/US2005/035102

§ 371 (c)(1),
(2), (4) Date: Mar. 28, 2007

(87) PCT Pub. No.: WO2006/039448

PCT Pub. Date: Apr. 13, 2006

(65) Prior Publication Data

US 2007/0277609 A1    Dec. 6, 2007

Related U.S. Application Data

(60) Provisional application No. 60/614,785, filed on Sep. 29, 2004.

(51) Int. Cl.
*G01L 25/00* (2006.01)
*G01L 5/10* (2006.01)
*G01L 1/10* (2006.01)

(52) U.S. Cl. .................. 73/862.41; 73/862.59; 73/1.08
(58) Field of Classification Search .................. 73/660, 73/579, 653, 655–657, 643, 12.04, 12.06, 73/862.06, 862.41, 862.59, 862.041, 862.045
See application file for complete search history.

(56) References Cited

U.S. PATENT DOCUMENTS

| | | | |
|---|---|---|---|
| 4,090,393 A | 5/1978 | Kharitonov et al. | |
| 4,178,799 A | 12/1979 | Schmieder et al. | |
| 4,493,220 A | 1/1985 | Carignan et al. | |
| 4,831,365 A * | 5/1989 | Thomas et al. | 340/680 |
| 5,325,701 A | 7/1994 | Zilliacus | |
| 6,349,600 B1 * | 2/2002 | Davies et al. | 73/660 |
| 7,165,456 B2 * | 1/2007 | Schmid et al. | 73/657 |
| 7,302,852 B2 * | 12/2007 | Chien | 73/643 |

* cited by examiner

*Primary Examiner*—Helen C. Kwok
(74) *Attorney, Agent, or Firm*—Alston & Bird LLP

(57) ABSTRACT

A high frequency flexure-based dynamometer for measuring vibrations to use in determining cutting forces in a tool is disclosed. The dynamometer device may operate within a pre-selected high frequency range while measuring cutting forces less than about 1 N. The dynamometer may include two coupled flexures that interact to produce vibration modes at the edge of a selected bandwidth of interest. These modes may produce a frequency response function within the desired frequency band that has a magnified response and is substantially constant. The dynamometer may include a workpiece mounted to one of the two flexures and a one or more precision accelerometers mounted to the first or second flexures. Finite element analysis may be used to optimize the flexure design.

21 Claims, 5 Drawing Sheets

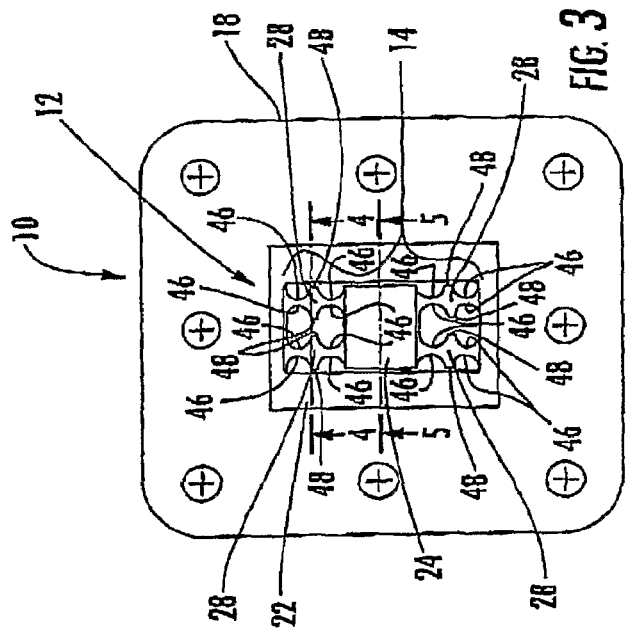
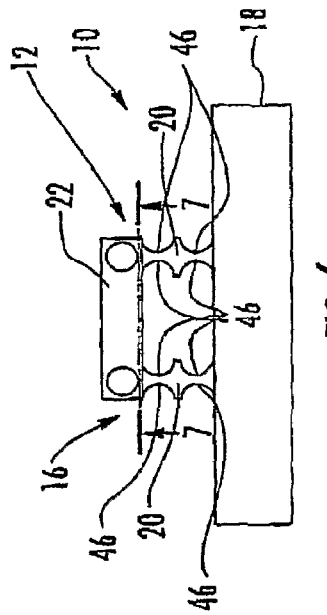
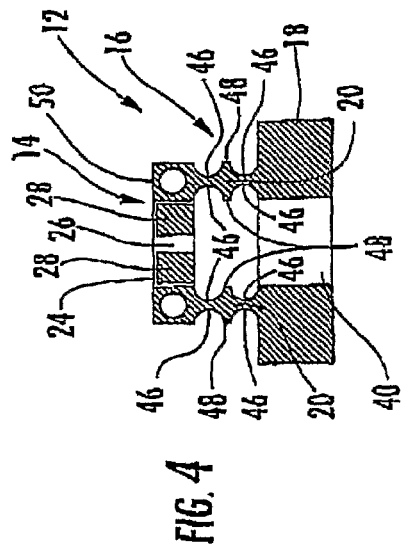
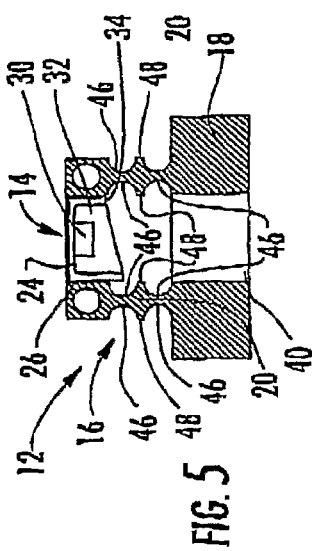
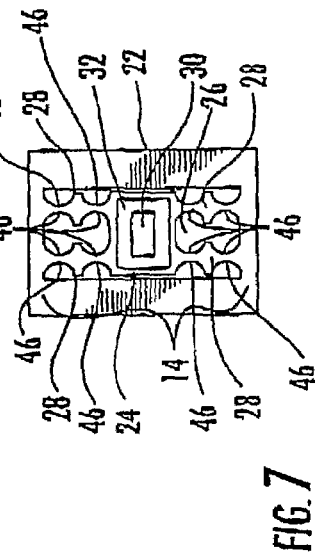

FLEXURE-BASED DYNAMOMETER FOR DETERMINING CUTTING FORCE

CROSS-REFERENCE TO RELATED APPLICATIONS

This application is in the national stage entry of International Application No. PCT/US2005/035102, filed Sep. 29, 2005, which claims priority to U.S. Provisional Patent Application No. 60/614,785, filed Sep. 29, 2004.

STATEMENT REGARDING FEDERALLY SPONSORED RESEARCH OR DEVELOPMENT

This invention was made with United States government support under number N00014-03-1-0582 awarded by the Office of Naval Research. The United States government has rights in the invention.

FIELD OF THE INVENTION

The invention relates to a device for measuring vibrations, and more specifically, to a device for measuring high frequency vibrations within a workpiece.

BACKGROUND

During the past decade, there has been a notable increase in the industrial use of high-speed machining technology. During this time, machining centers have been developed that are capable of operating with spindle and slide speeds that are an order of magnitude higher than spindle and slide speeds that are available on older machining centers. While these new machining centers offer the possibility of much higher material removal rates, improved surface finish, and increased workpiece quality, use of these new machining centers also requires more technical expertise than conventional machining centers, especially in monitoring the cutting processes.

In machine tool cutting operations, process forces are created between the workpiece and tool, and results in deformation. Measuring the process forces has become important, specifically in microcomponents produced for biomedical, aerospace, electronics and mold production applications. Process forces may be measured to determine when a process is no longer proceeding as it should and correction is needed by identifying when process forces deviate outside the usual range in continuous or cyclically repetitive processes. However, the usefulness of the measured process forces is determined by the accuracy and functional reliability of the sensors employed for monitoring the process forces.

A basic element in determining process performance is the ability to sense the force that the tool is experiencing. Such force data has indicated that tools undergo three stages of wear: a break-in stage, a relatively long and mild abrasive wear regime, and a final stage comprising an abrupt transition to severe adhesive wear that results in catastrophic failure of the tool. Progressive wear on cutting edges during such wear stages is accompanied by changes in the forces that are generated by the cutting tool operating at programmed speed and feed rates. Ideally, a tool is removed from service when the cutting forces reach a level corresponding to an end of an abrasive wear state or useful life of a tool before catastrophic failure of the tool. However, in micro-milling applications, a tool may need to be replaced earlier in the process due to the precision needed in these cutting applications.

The use of microcomponents in many applications has caused more focus to be placed on the accuracy in cutting processes used to make these components. The pursuit of smaller and smaller components has led to the development of micro-milling processes that are characterized by high spindle speeds (up to 500,000 rpm and higher) and low cutting force magnitudes (<1 N or 0.22 $b_f$). Due to these high spindle speeds, the tooth passing frequency, i.e., the fundamental cutting force frequency, may reach 16 kHz or higher for a two flute cutter, thereby making accurate measurement of these cutting forces even more important. One manner of measuring cutting forces in this application has been through the use of a piezoelectric dynamometer. High frequency bandwidth dynamometers have also been used to identify unstable cutting conditions, or chatter, in tools by examining a frequency spectrum of the cutting force signal. Significant content at frequencies other than the tooth passing frequency or its harmonics typically signifies chatter and can be used to select stable operating spindle speeds.

There are many operations that generate high frequency signals that may be measured. The ability to accurately measure these high frequency signals enables the process to be more precisely controlled, thereby increasing the operating efficiencies of these processes. One example of a process having a high frequency is a cutting operation wherein the process of a tool cutting into an object results in forces and vibrations. In such a process, the faster the operating speed of the tool, the higher the frequency of the forces and, in general, vibrations. However, the frequencies produced by tools operating at such high speeds may occur outside the effective range of prior art dynamometers.

Sharp tools typically have different cutting characteristics from dull or worn tools. In particular, wear lands develop on the cutting tool, which causes more of the cutting tool to come into contact with the workpiece during the cutting process. The increased contact area between the tool and workpiece causes more energy to be consumed by the cutting machine while making a cut because more energy is expended on non-productive work. Typically, increased forces necessary to operate a spindle in lathes, milling machines, etc. are indicative of an increase in non-productive work. In general, as the tool wears, the cutting force experienced by the tool increases.

Commercially-available piezoelectric dynamometers typically specify a bandwidth below the first natural frequency of the dynamometer structure, such as between 1 kHz and 3 kHz. Operation in this range enables the actual force to be determined by multiplying the time-domain dynamometer signal by a calibration constant. For operation outside this range, a force may be determined by multiplying the sensor signal (transformed to the frequency domain) by the inverted dynamometer frequency response function (FRF) to remove the influence of the dynamometer dynamics from the recorded signal. However, this approach is limited because the frequency response magnitude is generally very small at higher frequencies making it impossible to recover a valid force signal due to a poor signal-to-noise ratio. Additional difficulties encountered in measuring low cutting forces at high frequencies include: 1) a high resolution measurement device with a very large bandwidth is required, 2) a method is needed to excite the structure with a known input at all frequencies of interest to determine the FRF of the dynamometer system, and 3) a dynamometer system is needed that is capable of limiting the effect of forces in directions other than the direction of interest.

Thus, a need exists for an apparatus for accurately determining forces having a high frequency. A need also exists for an apparatus for determining force exerted in high-frequency applications. Finally, a need exists for an apparatus for determining force in one or more directions while limiting the effects of forces in other directions.

SUMMARY

The invention is directed to a dynamometer configured to measure high frequency vibrations to calculate forces, such as cutting forces. The dynamometer may be used in micro-milling processes having high spindle speeds and low cutting force magnitudes or in any other application in which the ability to accurately measure high frequency forces is needed. The measurement may be used to determine tool wear or to identify unstable cutting conditions. Having the ability to measure forces in micro-milling processes is especially beneficial due to the precision cutting needed for microcomponent fabrication by machining.

The dynamometer may be formed from a force stage flexure formed from a force stage that is supported off of a base and in communication with the base. The dynamometer may also include a vibration flexure coupled to the force stage and sized smaller than the force stage flexure. In at least one embodiment, the dynamometer may be configured to measure forces in a single direction using two coupled, single degree-of-freedom flexures, the force stage flexure and the vibration flexure, that interact to produce vibration modes at an edge of the bandwidth of interest. In another embodiment, the dynamometer may be configured to measure forces in two directions using two coupled, two degree-of-freedom flexures, the force stage flexure and the vibration flexure, that interact to produce vibration modes at an edge of the bandwidth of interest. The force stage flexure and the vibration flexure may be made from a material selected from the group consisting of tungsten carbide, a ceramic, or other appropriate materials, or a combination of thereof.

The dynamometer may include at least one vibration sensing device. In one embodiment, the vibration sensing device may only be coupled to the vibration flexure. In another embodiment, the vibration sensing device may be coupled to the force stage flexure and to the vibration flexure. The vibration sensing device coupled to the force stage flexure may be capable of measuring vibrations having a frequency less than about 10 kHz. The vibration sensing device coupled to the vibration flexure may be capable of measuring vibrations having a frequency of more than about 10 kHz, such as in a range of from about 10 kHz to about 16 kHz. The force stage flexure may establish a lower limit of the frequency of measured vibrations, and the vibration flexure may establish an upper limit of the frequency of measured vibrations. The dynamometer may be capable of measuring a vibration that correlates to a cutting force of less than about 2 N, and in some embodiments, less than about 1 N.

In the embodiment in which the dynamometer measures vibrations in a single direction, the force stage flexure comprises a force stage supported by at least one leg extending between the force stage and a base. In particular, the force stage may be supported by a plurality of legs that may include notches on an outer surface of the legs. The dynamometer may include a vibration flexure that may be supported by the force stage flexure. The vibration flexure may be formed from a plate positioned within a cavity in the force stage and supported by at least one arm extending from the force stage to the plate. In at least one embodiment, the vibration flexure may include a plurality of arms extending from the plate to the force stage. The arms may include one or more notches. The vibration flexure may be sized smaller than the force stage flexure to establish the effective ranges previously set forth.

In the embodiment in which the dynamometer may be configured to measure forces in two directions using two coupled, two degree-of-freedom flexures, the force stage flexure may be formed from a generally cylindrical body having an internal cavity that is sized to contain the vibration flexure. The body of the force stage flexure may include at least one ring on an outer surface of the body and at least one ring on an inner surface of the body. The vibration sensing device coupled to the force stage flexure may include a first vibration sensing device coupled to an outer surface of the force stage flexure, and a second vibration sensing device coupled to the outer surface of the force stage flexure positioned about 90 degrees from the first vibration sensing device. The vibration flexure may include a first vibration sensing device coupled to an outer surface of the at least one vibration flexure and a second vibration sensing device coupled to the outer surface of the at least one vibration flexure positioned about 90 degrees from the first vibration sensing device. Alternatively, the force stage flexure and the vibration flexure may include biaxial vibration sensing devices rather than two vibration sensing devices. The vibration sensing device in any of these embodiments may be an accelerometer, a laser interferometer, a laser vibrometer, a capacitance probe, or other appropriate device.

The dynamometer may also include a top plate attached to the force stage flexure. A workpiece may be mounted to the top plate for providing a surface against which a tool may be rotated to remove material.

The flexures of the dynamometer interact to produce vibration modes at an edge of the bandwidth of interest. These modes may produce a frequency response function within the desired frequency band that has a magnified response and nearly constant amplitude between modes. The frequency response of the vibrations may also be examined to identify unstable machining conditions. A workpiece may be mounted to one of the two flexures and a vibration sensing device may be mounted to the other flexure.

This invention may also include a method for measuring high frequency vibrations that includes placing a tool in contact with a workpiece on a high frequency measuring dynamometer. The high frequency measuring dynamometer may include a force stage flexure formed from a force stage that is supported off of a base and in communication with the base, a vibration flexure coupled to the force stage and sized smaller than the force stage flexure, and at least one vibration sensing device coupled to the vibration flexure and capable of measuring vibrations having a frequency greater than about 10 kHz. Once the tool is in contact with the workpiece, the tool may be rotated and may remove material from the workpiece. The frequency developed in the workpiece may be measured using the at least one vibration sensing device. The frequency may be converted into force to determine the amount of force exerted on the workpiece by the tool. Analysis of the force imparted on the workpiece can enable a determination to be made regarding whether a tool is operating within its useful life.

BRIEF DESCRIPTION OF THE DRAWINGS

Other objects, features and advantages of the present invention will become apparent upon reading the following detailed description, while referring to the attached drawings, in which:

FIG. 3 is a top plan view of the dynamometer shown in FIG. 2.

FIG. 4 is a cross-sectional view of the dynamometer shown in FIG. 3 taken along section line 4-4.

FIG. 5 is a cross-sectional view of the dynamometer shown in FIG. 3 taken along section line 5-5.

FIG. 6 is a front view of the dynamometer shown in FIG. 3.

FIG. 7 is a cross-sectional view of the dynamometer shown in FIG. 6 taken along section line 7-7.

DETAILED DESCRIPTION

Figure 1:
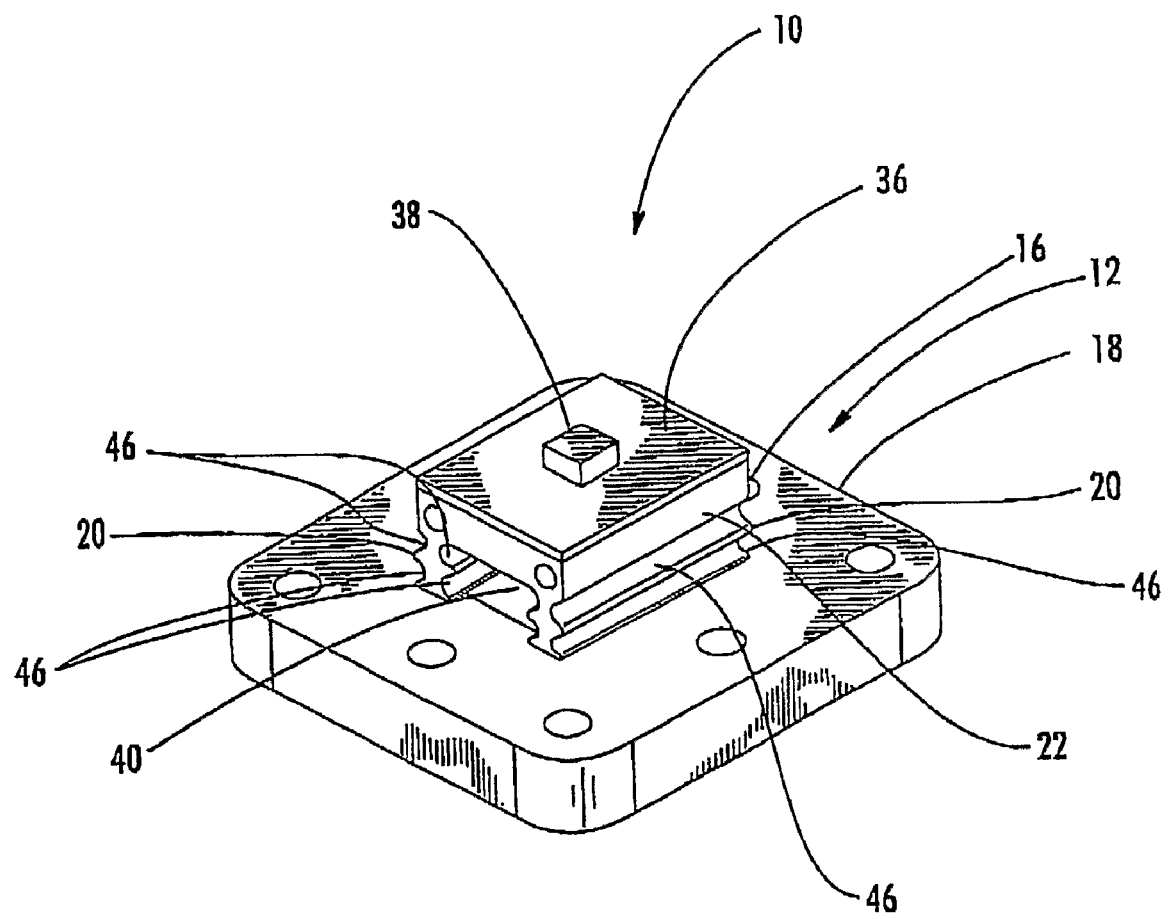
FIG. 1 is a perspective view of a dynamometer including aspects of the invention.

As used herein, the term "machine-tool" includes machines employing cutting tools including, but not limited to, milling tools and lathe tools. As used herein, the term "machining" refers to methods employing machine-tools. As used herein, the term "lathe tool" refers to any piece of material that rotates relative to the cutting tool. As used herein, the term "milling tool" refers to a cutting tool that rotates relative to a material to be cut by the milling tool. As used herein, the term "flute" refers to one or more cutting edges on a cutting tool that cut a piece of material as the milling tool rotates. A flute may be a removable insert or may be a cutting projection that is part of a unitary milling tool. A flute may also include objects that simulate a flute. As used herein, a "spindle" refers to a device for rotating a milling tool, a lathe test bar, a milling test bar, or a piece of material mounted on a lathe. For the purposes of the present invention, the term "high-speed machine-tool" refers to a machine-tool capable of being rotated at spindle speeds of at least 100,000 rpm, although lower spindle speeds may also be considered "high" in some applications. The term "vibration" as used herein means any mechanical wave displacement, velocity or acceleration emitted by a tool when in use and encompasses the phenomenon known as acoustic emission.

This invention is directed to a dynamometer 10, as shown in FIGS. 1-10, designed to measure high frequency vibrations to calculate forces, such as cutting forces. The dynamometer 10 may be used in micro-milling processes having high spindle speeds and low cutting force magnitudes, or in any other applications in which the ability to accurately measure high frequency forces is needed. The measurement made using the dynamometer 10 may be used to determine tool wear or to identify unstable cutting conditions. Having the ability to determine forces present in micro-milling processes is especially in applications in which precision cutting is needed for making microcomponents.

In at least one embodiment, the dynamometer 10 may include two coupled, single degree-of-freedom flexures 12 that may interact to produce vibration modes at the edge of the bandwidth of interest. The dynamometer 10 may have an amplified response within the selected frequency range and an attenuated response outside of this range. Nevertheless, due to the construction of the dynamometer or the materials used to form the dynamometer 10, or both, this frequency range may be much higher than standard dynamometers that generally exhibit an attenuated response above 10 kHz. These modes may produce a frequency response function (FRF) within the desired frequency band that has a magnified response and nearly constant value between modes. To limit the effect of additional structural modes, finite element analysis (FEA) may be used to optimize the flexure design by forcing the natural frequencies of additional modes above the bandwidth of interest. In an another embodiment, as shown in FIG. 8-10, the dynamometer 10 may include two flexures 12 having two degrees-of-freedom that may interact to produce vibration modes at the edge of the bandwidth of interest.

The accumulation of vibration data correlating to cutting forces may be accomplished by the dynamometer 10 as it senses the cutting force through a workpiece 38. The dynamometer 10 may use a vibration sensing device 30 for detecting vibrations. The vibration sensing device 30 may be, but is not limited to being, a laser vibrometer, a laser interferometer, a capacitance probe, or other appropriate device to detect vibrations in the tool as it is being used. The dynamometer 10 may be capable of operating in a much higher frequency range than conventional dynamometers. For instance, the dynamometer 10 may accurately operate in a frequency range from about 10 kHz to about 20 kHz. In an alternative embodiment, the dynamometer 10 may accurately operate in a frequency range from about 12 kHz to about 16 kHz. In yet another embodiment, the dynamometer 10 may operate in a frequency range greater than 20 kHz depending on the shape of the dynamometer 10 or the materials used to form the dynamometer, or both. In addition, the dynamometer 10 may be capable of measuring cutting forces less than about 2 N, and in some embodiments, less than about 1 N.

Figure 8:
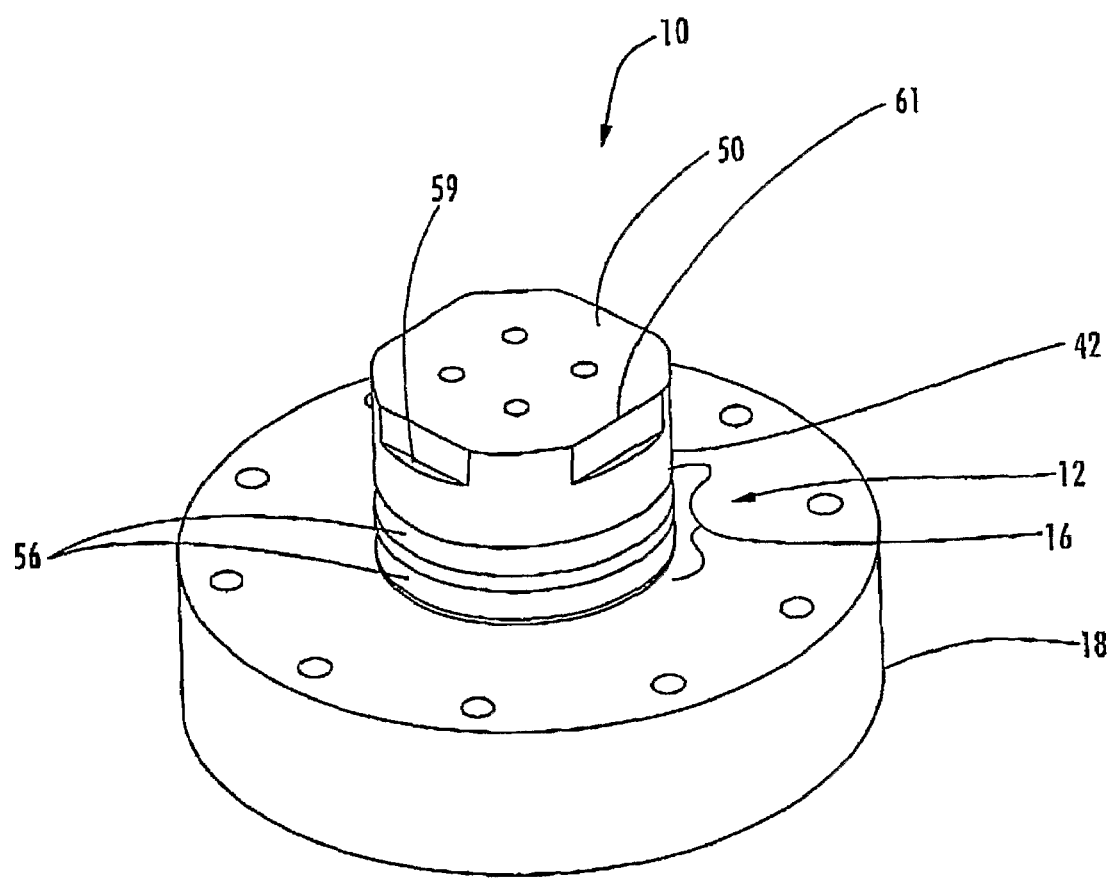
FIG. 8 is a perspective view of another embodiment of a dynamometer of this invention.
Figures 9, 10:
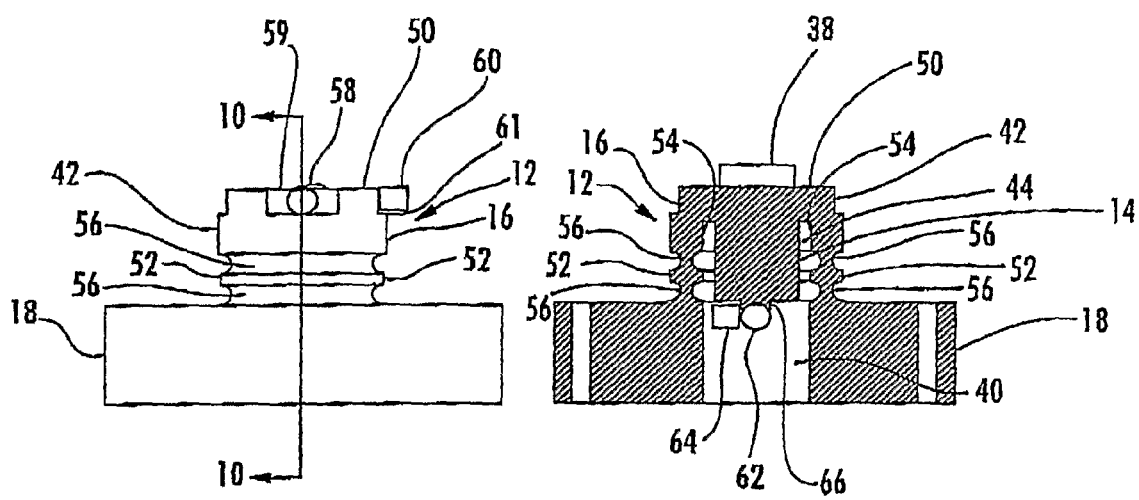
FIG. 9 is a front plan view of the dynamometer shown in FIG. 8.
FIG. 10 is a cross-sectional view of the dynamometer shown in FIG. 9 taken along section line 10-10.

The dynamometer 10 may be configured to measure forces in a single direction, as shown in the embodiments in FIGS. 1-7, and may be configured to measure forces in two directions, as shown in FIGS. 8-10. The dynamometer 10 configured for measuring forces in a single direction, as shown in FIG. 1, may be formed from two flexures 12, which may include, but are not limited to, a vibration flexure 14 and a force stage flexure 16. The flexures 12, as shown in FIGS. 1-7, may be single degree-of-freedom flexures 12 such that the flexures 12 are capable of flexing in only one direction.

Figure 2:
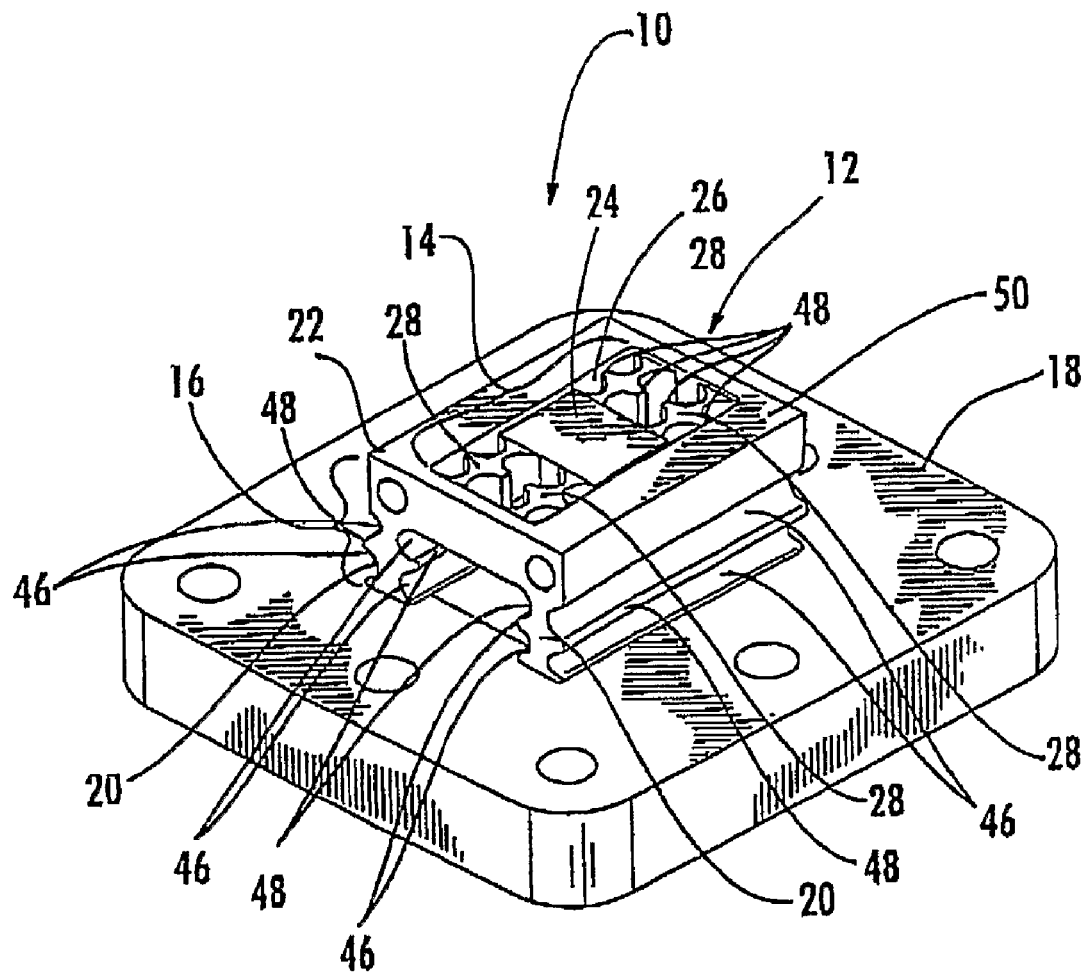
FIG. 2 is a perspective view of a dynamometer including aspects of the invention and having a top plate removed.

As shown in FIGS. 1 and 2, the force stage flexure 16 may include a base 18 and one or more legs 20 extending from the base 18. The base 18 may be generally rectangular or have another appropriate shape. In at least one embodiment, the legs 20 may extend generally orthogonal from the base 18. The base 18 may have any configuration appropriate to support the remaining components of the dynamometer 10. A force stage 22 may be coupled to the legs 20 opposite an intersection between the legs 20 and the base 18. While two legs 20 are shown in FIGS. 1 and 2, it is to be understood that the force stage flexure 16 may include any number of legs 20, such as one, two, three or more.

The force stage flexure 16 may be formed from a material having a high strength to weight ratio. The higher the strength to weight ratio, the higher the natural frequency of the structure and, therefore, the higher the frequency range in which the dynamometer 10 may be used. In one embodiment, the dynamometer 10 may be constructed from tungsten carbide, which permits a frequency range of from about 10 kHz to about 16 kHz. For other materials, the frequency range of the dynamometer may operate from about 14 kHz to about 20 kHz. Frequency ranges of greater than about 20 kHz may also be possible depending, in part, on the material. An example of another material having a high strength to weight ratio is ceramics. In one embodiment, the vibration flexure 14 and the force stage flexure 16 may be formed from the same material and may be coupled together.

The dynamometer 10 may also include a vibration flexure 14 adapted to sense vibrations. The vibration flexure 14 may be sized smaller than the force stage flexure 16. In particular, the vibration flexure 14 may be positioned within the force stage flexure 16, as shown in FIGS. 2, 3 and 7. In particular, the vibration flexure 14 may be positioned within the force stage 22. As shown in FIG. 2, the vibration flexure 14 may be formed from a plate 24 positioned within a cavity 26 in the force stage 22. The plate 24 may be supported with one or more arms 28 extending between the force stage 22 and the plate 24. In at least one embodiment, the vibration flexure 108 may include four arms 28 such that an arm 28 extends from each of the four corners of the plate 24. The arms 28 may be assembled into two pairs of arms that extend generally parallel from the plate 24. The arms 28 forming each air may be generally parallel to each other. In other embodiments, the vibration flexure may include any number of arms 28, such as one or more arms, depending on design characteristics.

In at least one embodiment, the vibration flexure 14 may include one or more vibration sensing devices 30. In at least one embodiment, the vibration sensing device 30 may be an accelerometer 30, as shown in FIG. 5. The accelerometer 30 may be coupled to the plate 24 within a plate cavity 32. The plate cavity 32, as shown in FIG. 4, may be positioned in a bottom surface 34 of the plate 24. Access to the accelerometer 30 may be made through base cavity 40 positioned in the base 18. The base cavity 40 may have any size appropriate to enable the accelerometer 30 to be inserted or retrieved, or both, through the base cavity 40. The position of the accelerometer 30 and the orientation of the legs 20 may be selected to enable the accelerometer 30 to sense vibrations in different directions. The position of the accelerometer 30 may be selected such that a satisfactory signal is provided without excess noise. An example of the accelerometer 30 may be, but is not limited to being, Model 352B10 manufactured by PCB Piezotronics, Inc. of Depew, N.Y.

The dynamometer 10 may also include a top plate 36, as shown in FIG. 1. The top plate 36 may be supported by the force stage 22 and the plate 24. The top plate 36 may be configured to support a workpiece 38. The workpiece 38 may be configured such that a milling cutter, or other such tool, may be placed in contact with the workpiece 38 and rotated at high rates of speed. In at least one embodiment, the top plate 36 may not contact the plate 24. However, in an alternative embodiment, the top plate 36 may be coupled to the plate 24 such that the plate 24 and the top plate 36 form a single unit for purposes of measuring force vibrations. In yet another alternative embodiment, the dynamometer 10 may not include a top plate 36.

The frequency range sensed by the vibration sensing device 30 may be adjusted by using different materials to construct the flexures 12. In addition, the shape of the legs 20 in the force stage flexure 16 and the shape of the arms 28 in the vibration flexure 14 can be used to control the range of frequencies of the dynamometer 10. As shown in the FIGS. 1-7, the legs 20 and the arms 28 may include notches 46 on outer surfaces 48 of the legs 20 and arms 28. The embodiments shown include two notches 46 on each side of the legs 20 and arms 28. Other embodiments of the dynamometer 10 may have other numbers of notches 46. The notches 46 may have generally semicircular shapes and in other embodiments, may have other appropriate configurations. For instance, spring flexures, which are formed from substantially straight legs, may be used as well.

As previously discussed, the dynamometer 10 may be configured to measure forces in more than one direction. For instance, the dynamometer 10 may be configured to measure forces in at least two directions using, for instance, the embodiment shown in FIGS. 8-10. The dynamometer 10 may be formed from a base 18, which may have a generally circular cross-section, and a force stage flexure 16 extending from the base 18. The force stage flexure 16 may be formed from a generally cylindrical body 42 having an internal cavity 44, as shown in FIG. 10. The internal cavity 44 may be configured to receive a vibration flexure 14 extending from the body 42. The vibration flexure 14 may be sized smaller than the force stage flexure 16. An upper surface 50 of the force stage flexure 16 may be configured to support a workpiece 38. An outer surface 52 of the body 42 or an inner surface 54, or both, may include one or more rings 56. The rings 56 may be configured to control the range of frequencies in which the dynamometer 10 may operate and to enable motion in more than one direction. The rings may have a generally semicircular cross-section, as shown in FIGS. 8-10, or may have another appropriately shaped cross-section.

The dynamometer 10 that is configured to sensing vibrations and determine forces in more than one direction, as shown in FIGS. 8-10, may include one or more accelerometers 58, 60, 62, and 64. For instance, the force stage flexure 16 may include one or more accelerometers 58, 60. As shown in FIG. 9, the force stage flexure 16 may include a first accelerometer 58 and a second accelerometer 60 positioned on an outer surface 52 of the body 42 about 90 degrees from the first accelerometer 58. The first and second accelerometers 58, 60 may be positioned in recesses 59, 61, respectively. The accelerometers 58, 60 may be unilateral accelerometers. In an alternative embodiment, the accelerometers 58, 60 may be replaced with a single biaxial accelerometer.

The vibration flexure 14 may include one or more accelerometers 62, 64 for sensing vibrations and determine forces in one or more directions. As shown in FIG. 10, the vibration flexure 14 may include a first accelerometer 62 and a second accelerometer 64 positioned on a protrusion 66 on the vibration flexure 14. The first and second accelerometers 62, 64 may be positioned about 90 degrees from each other. The accelerometers 62, 64 may be unilateral accelerometers. In an alternative embodiment, the accelerometers 62, 64 may be replaced with a single biaxial accelerometer. The measurements taken by the accelerometers 58 and 62 may be combined to form a single force signal, and the measurements taken by the accelerometers 60 and 64 may be combined to form a single force signal.

The dynamometer 10 shown in FIGS. 1-10 may be capable of measuring high frequency vibrations and low frequency vibrations due, at least in part, to the size and configuration of the vibration flexure 14 and the force stage flexure 16. By combining the signals and with appropriate signal conditioning, the force stage signal may be used to recover lower frequency content, while the vibration flexure signal may be used to determine higher frequency content. The two can then be combined to provide wide bandwidth force measurements.

During use, a tool, such as, but not limited to, a milling cutter or other appropriate tool, may be placed into contact with the workpiece 38. The milling cutter may be rotated to generate forces on the workpiece 38. The cutting action causes vibrations to be generated at the cutting edge of the cutting tool. The vibrations propagate through the cutting tool much in the same manner as sound waves in a room. The vibrational waves produced at the cutting edge propagate through the vibration flexure 14 of the dynamometer 10 and through the force plate flexure 16. The vibrational waves are measured by the accelerometers 30 or other vibration sensing device 30. In particular, the force stage flexure 16 experiences axial forces and bending moments transmitted from the workpiece 38 to top plate 36. The force stage flexure 16 may set a lower limit on the range of frequencies that may be accurately measured by the dynamometer 10 because the force stage flexure 16 is larger than the vibration flexure 14. In addition, the vibration flexure 14 may set a higher limit on the range of frequencies that may be accurately measured by the dynamometer 10 because the vibration flexure 14 is smaller than the force stage flexure 16 in at least one embodiment.

The dynamometer 10 may be constructed using an electrical discharge machining (EDM) process to form the flexures 12. In one embodiment, an electrode may be place in close proximity to a piece of material. A current may be passed between the electrode and workpiece to melt the material to form the flexures 12 having the selected shape. Depending on the material, the process for forming the flexures 12 may vary.

The dynamometer 10 may be used with many different milling or micro-milling machine tools including, but not limited to, lathes milling machines, machining centers, and drills. The dynamometer 10 may be used with a variety of different workpieces including, but not limited to, metals such as iron, cast iron, steel, titanium, NiCrFe such as INCONEL, copper, aluminum, or other appropriate materials. The dynamometer 10 may be used in any other process wherein the measurement of high frequency signals may be beneficial.

It is to be understood that while the invention has been described in conjunction with the specific embodiments thereof, that the foregoing description is intended to illustrate and not limit the scope of the invention. Other aspects, advantages and modifications within the scope of the invention will be apparent to those skilled in the art to which the invention pertains.

We claim:

1. A dynamometer for measuring high frequency vibrations, comprising:
    a force stage flexure formed from a force stage that is supported by at least one leg extending from a base to the force stage;
    a vibration flexure coupled to the force stage and sized smaller than the force stage flexure; and
    at least one vibration sensing device coupled to the vibration flexure and capable of measuring vibrations having a frequency greater than about 10 kHz.

2. The dynamometer of claim 1, further comprising at least one vibration sensing device coupled to the force stage flexure and capable of measuring vibrations having a frequency less than about 10 kHz.

3. The dynamometer of claim 2, wherein the at least one vibration sensing device coupled to the force stage flexure comprises a first vibration sensing device coupled to an outer surface of the force stage flexure and a second vibration sensing device coupled to the outer surface of the force stage flexure and positioned about 90 degrees from the first vibration sensing device.

4. The dynamometer of claim 1, wherein the force stage flexure is formed from a generally cylindrical body having an internal cavity that is sized to contain the vibration flexure.

5. The dynamometer of claim 4, wherein the body of the force stage flexure includes at least one ring on an outer surface of the body and at least one ring on an inner surface of the body.

6. The dynamometer of claim 4, wherein the at least one vibration sensing device comprises a first vibration sensing device coupled to an outer surface of the vibration flexure and a second vibration sensing device coupled to the outer surface of the vibration flexure positioned about 90 degrees from the first vibration sensing device.

7. The dynamometer of claim 1, further comprising at least one notch in the at least one leg extending between the force stage and the base.

8. The dynamometer of claim 1, wherein the vibration flexure comprises a plate positioned within a cavity in the force stage and supported by at least one arm extending from the force stage to the plate.

9. The dynamometer of claim 8, wherein the at least one arm comprises a plurality of arms having at least one notch.

10. The dynamometer of claim 1, further comprising a top plate attached to the force stage flexure and a workpiece mounted to the top plate.

11. The dynamometer of claim 1, wherein the at least one vibration sensing device is capable of measuring vibrations having a frequency between about 10 kHz and about 16 kHz.

12. The dynamometer of claim 1, wherein the force stage flexure is configured to establish a lower limit of the frequency of measured vibrations, and the vibration flexure is configured to establish an upper limit of the frequency of measured vibrations.

13. The dynamometer of claim 1, wherein the dynamometer is capable of measuring vibrations correlating to cutting forces that are less than about 2 N.

14. The dynamometer of claim 13, wherein the dynamometer is capable of measuring vibrations correlating to cutting forces that are less than about 1 N.

15. The dynamometer of claim 1, wherein the at least one vibration sensing device is selected from the group consisting of an accelerometer, a laser interferometer, a laser vibrometer and a capacitance probe.

16. The dynamometer of claim 1, wherein the force stage flexure and the vibration flexure are made from a material selected from the group consisting of tungsten carbide, a ceramic, and a combination of these materials.

17. A method for measuring high frequency vibrations, comprising:
    placing a tool in contact with a workpiece on a high frequency measuring dynamometer, wherein the high frequency measuring dynamometer is comprised of:
        a force stage flexure formed from a force stage that is supported by at least one leg extending from a base to the force stage;
        a vibration flexure coupled to the force stage and sized smaller than the force stage flexure; and
        at least one vibration sensing device coupled to the vibration flexure and capable of measuring vibrations having a frequency greater than about 10 kHz;
    rotating the tool; and
    measuring the frequency of vibrations in the workpiece using the at least one vibration sensing device.

18. The method of claim 17, wherein the measuring the frequency of vibrations in the workpiece using the at least one vibration sensing device comprises measuring the frequency of vibrations in the workpiece using at least one vibration sensing device coupled to the force stage flexure and using at least one vibration sensing device coupled to the vibration flexure.

19. The method of claim 18, wherein the measuring the frequency of vibrations in the workpiece using at least one vibration sensing device coupled to the force stage flexure comprises measuring the frequency in the workpiece using a biaxial vibration sensing device.

20. The method of claim 18, wherein the measuring the frequency of vibrations in the workpiece using at least one vibration sensing device coupled to the vibration flexure comprises measuring the frequency of vibrations in the workpiece using a biaxial vibration sensing device.

21. The method of claim 17, further comprising establishing a lower limit of the frequency to be measured using the force stage flexure and establishing an upper limit of the frequency to be measured using the vibration flexure.

* * * * *